United States Patent Office 3,374,842
Patented Mar. 26, 1968

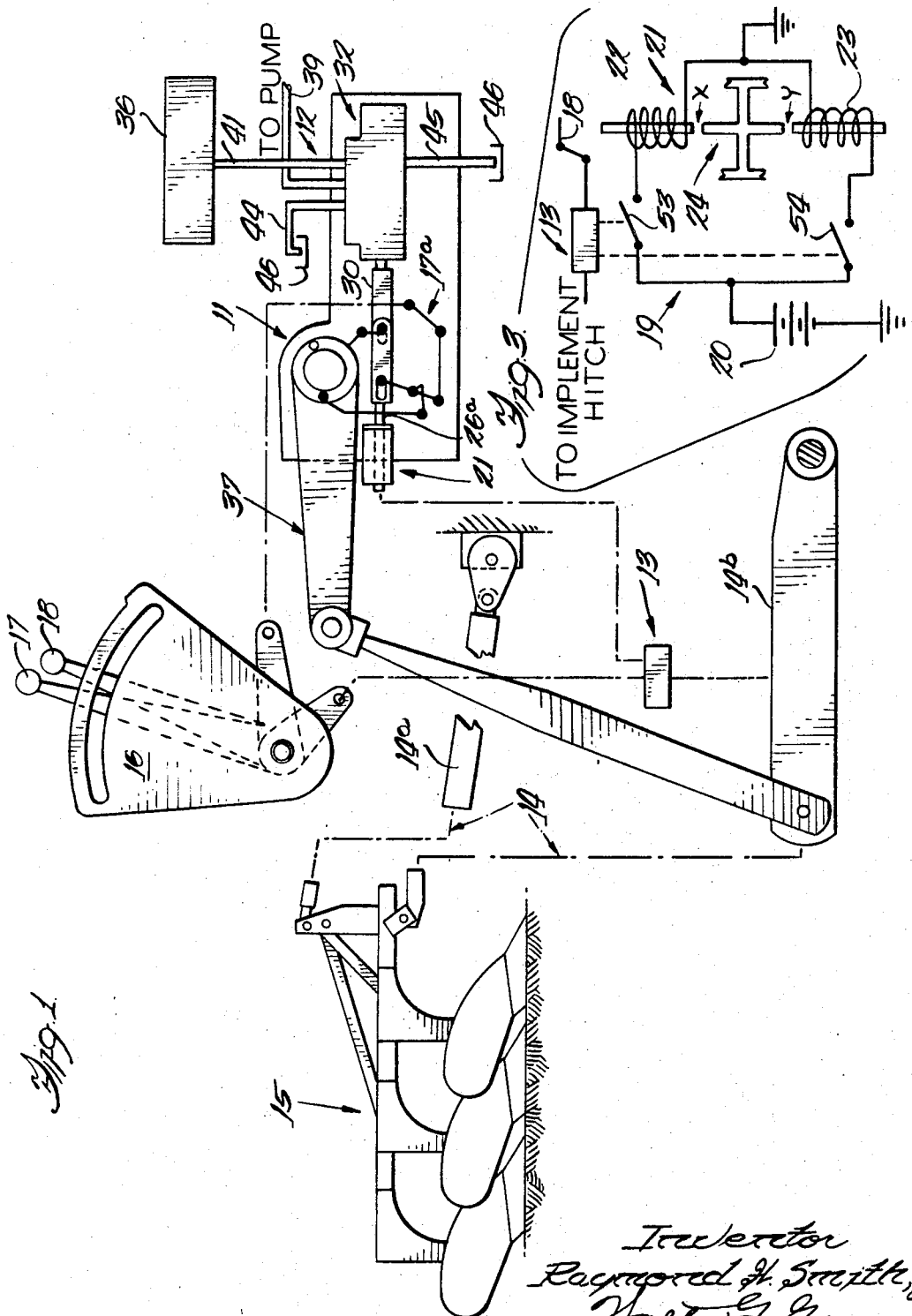

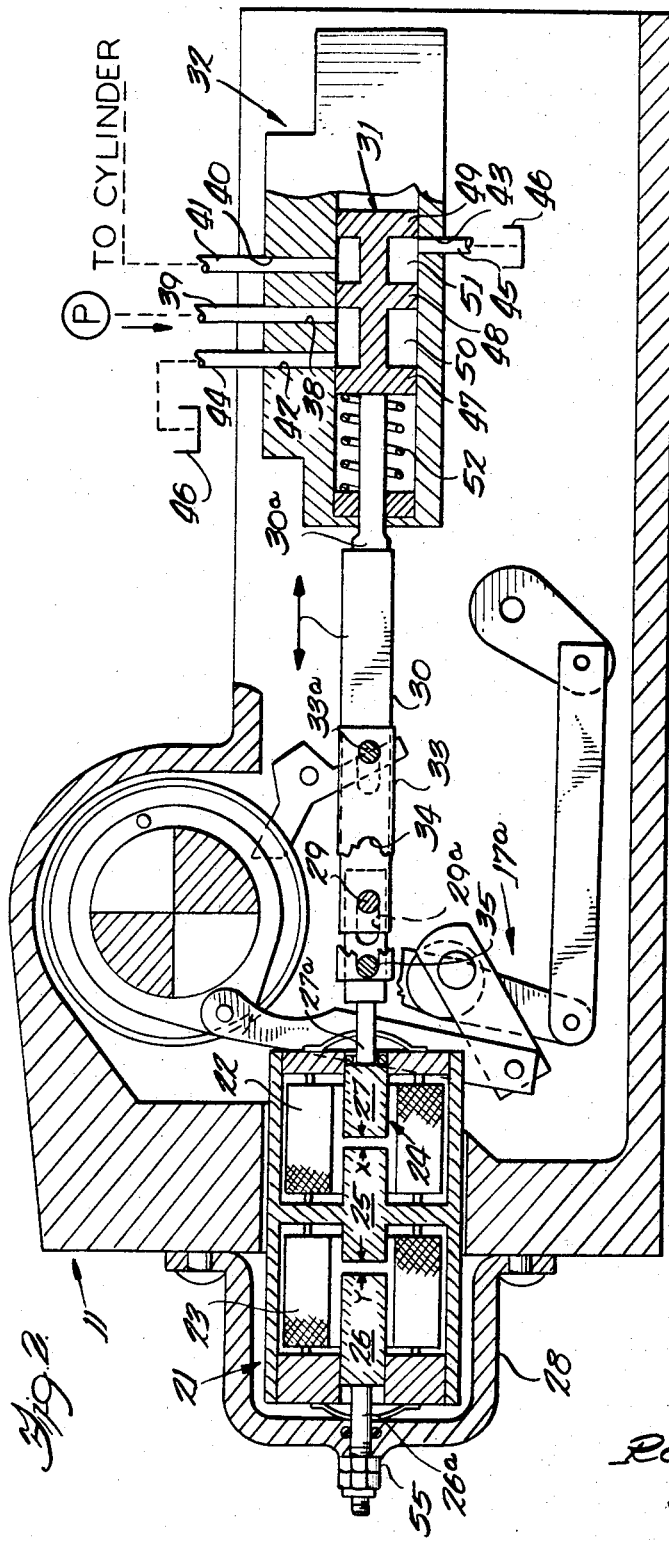

3,374,842
SOLENOID ACTUATOR FOR HYDRAULIC
DRAFT CONTROL SYSTEM
Raymond H. Smith, Jr., Lockport, Ill., assignor to International Harvester Company, Chicago, Ill., a corporation of Delaware
Filed Apr. 30, 1965, Ser. No. 452,093
8 Claims. (Cl. 172—7)

ABSTRACT OF THE DISCLOSURE

An electrical circuit capable of controlled positioning of a hydraulic valve in the power lift mechanism of a tractor to raise and lower a tractor-drawn implement in response to the sensing of undesired draft load conditions, which circuit includes a three member solenoid with two separate windings, the solenoid being operatively connected to the hydraulic valve for successive positioning thereof in response to successive energizing and deenergizing of the windings by switches which are actuated to make and break the circuit in response to a signal from a draft load sensing mechanism.

---

This invention relates to a system for controlling the lifting mechanism of a tractor to enable the working of an implement drawn thereby and to interrupt and modify such working, especially in the presence of undesired changes in load conditions. More particularly the invention relates to mechanism for actuating hydraulic apparatus to raise and lower a tractor hitch connected with such an implement in response to the sensing of undesired draft load conditions such as departure by a predetermined amount from an intended operational limit, and thus to supplement the usual hydraulic control of the apparatus.

It is well-known to operate lifting mechanism of a tractor to raise and lower a hitch connected with an implement drawn thereby to interrupt, and to establish working conditions of draft load hydraulically by the operation of the control valve of a hydraulic system in response to departures from selected operational limits. An example is found in Poynor Patent No. 2,927,649 of Mar. 8, 1960, and Brudnak et al. Patent No. 3,132,699 of May 12, 1964.

This invention relates to novel electrical apparatus including a solenoid for actuating such a valve and electrical means for energizing the solenoid in supplementation of such control.

An object of the invention is to provide apparatus including a solenoid operatively connected to actuate the control valve of such a system to various positions of operation in response to draft load conditions while still permitting the normal actuation of the valve in conditions of acceptable draft load.

An additional object of the invention is to provide electrical apparatus including a solenoid for supplementing the usual hydraulic control in the operation of a hydraulic system to raise and lower the hitch of a tractor to permit the working of an implement connected thereto within predetermined limits of draft load and to interrupt such working upon such limits being exceeded.

It is deemed desirable in the operation of such equipment to limit departures from the established draft or load settings in the order of ±200 lbs., or 5%, whichever is greater, e.g., at the 1000 lbs. setting, 1200 lbs. maximum; at 5000 lbs., 5250 lbs. maximum; and when such departures are indicated to interrupt the working of the implement by raising or lowering it and thus remove the undesired condition. It is contemplated in the present invention that the draft load under operating conditions will be indicated by means of a conventional strain gauge or load sensing device (not shown), and to utilize the indicated values in the operation of the electrical apparatus now described.

Another object of the invention is to provide electrical apparatus including an electrical circuit with a solenoid for actuating a control valve in response to the operation of a strain gauge or load sensing device of conventional or commercially well-known type indicating departure of predetermined amount from a selected operational limit of draft load.

A further object of the invention is to provide novel electrical apparatus having such a circuit and including a solenoid energizable (1) in response to an attached implement attaining a position corresponding to a selected setting thereof to actuate a control valve from a first position wherein the coils of the solenoid are deenergized and the valve is conditioned to effect a lowering of the hitch to work the implement under desired draft load, to a second, or neutral position of inactivity in which the existing work condition under normal control of the hydraulic system is undisturbed, and (2) in response to a predetermined amount of such departure from a selected draft setting to actuate said valve from said second or neutral position to a third position of raising the hitch and the implement to ameliorate the undesired condition and bring the position of the implement within the desired operational range of draft load.

Other objects and advantages of the invention will appear from the description which follows in connection with the accompanying drawings:

FIG. 1 is a fragmentary and somewhat diagrammatic view in side elevation of the rear end of a tractor having incorporated therein the features of the present invention in relation to an implement mounted thereon for vertical movement between operating, and non-operating or transport positions;

FIG. 2 is a diagrammatic vertical sectional view on an enlarged scale of a portion of the apparatus of this invention taken along the longitudinal axis of the solenoid and the control valve;

FIG. 3 is a wiring diagram.

FIG. 4 is a fragmentary top plan view of the linkage interconnecting the solenoid and the control valve.

Referring to FIG. 1, the tractor indicated generally by the reference numeral 11 is equipped with a conventional hydraulic control system indicated by reference numeral 12 and a generally conventional strain gauge or load sensing system such as indicated at 13, neither of which per se forms any part of this invention. These control and sensing systems are related to a well-known hitch mechanism, indicated generally at 14, of the type which includes an upper link 14a and a pair of laterally spaced lower links, only one of which is shown at 14b, pivotally carried by the tractor and operationally connected with an implement 15, which may be a plow or other work performing tool or machine, for vertical movement of the latter between working and non-working positions as for maintaining the implement in a selected position of work, or non-work such as in transport.

The hydraulic control system or means 12 is shown herein in limited structural detail since reference may be had to the aforementioned Brudnak et al. patent for a more complete recital and disclosure of the structural components adaptable for incorporation herein. The load sensing system or means 13 may, of course, be operationally associated with either the upper or lower linkage components of the hitch mechanism and may be generally conventional. As illustrated herein, it is employed so as to be responsive to motivation by the action of the lower links and may be of a type such as disclosed in co-pending U.S. patent application Ser. No. 323,485 although it should not be deemed to be limited to the species thereof.

Control system 12 and sensing system 13 are coordinated in well known manner through the appurtenances of implement control quadrant 16 which include manual control levers 17 and 18 for establishing position and draft control settings to which the operations of these systems are correlated. Position control lever 17 is connected by associated linkage, indicated generally at 17a, with the hitch mechanism and control system in a manner such as shown and described in the aforementioned Brudnak et al. patent. It may be assumed for present purposes that the tractor 11 is of moderate size and that the draft control setting may be one of a plurality, such, for instance, as light (1000 lbs.), medium (2500 lbs.) or heavy (5000 lbs.) with intermediate gradations therebetween and that when in the operation of the implement there is a departure from a selected one of these values or settings of a predetermined amount that departure will be reflected by the sensing system or means 13 in such manner as to actuate the electrical apparatus 19 which will thereafter transmit an appropriate signal to the control system 12.

Electrical apparatus 19 comprises a source of electrical energy 20, a solenoid 21 having a pair of spaced coils or windings 22, 23 separately energizable in a manner to be described and adapted to actuate a centrally disposed armature mechanism slidable therewithin and indicated generally at 24. Armature 24 may be fashioned with a first central frame-like member 25 with extensions enveloping the coils 22, 23, a second member 26 having an extension 26a thereon, and a third member 27 having an extension 27a thereon. Armature portions 26 and 27 are disposed on opposite sides of the central armature portion 25. Extension 26a is adjustably disposed in a cover or cap 28 suitably fastened to the tractor 11, while extension 27a is pivotally attached at 29 through a slot 29a (FIG. 4) to the parallel arms of a yoke member 30 the opposite ends of which are joined and have an extension 30a extending therefrom that is affixed to a spool 31 of control valve 32 whereby upon movement of armature 24 spool 31 will be correspondingly displaced.

A link 33 (FIG. 4) has one end thereof connected at 33a to yoke 30 and the opposite end of said link is provided with a slot 34 whereby position control linkage 17a is slidably connected at 35 to the link 33. In this manner provision is made to permit the position control linkage 17a to also actuate control valve 32 as described in the aforementioned Brudnak et al. patent.

Control valve 32 is conventionally arranged in control system 12 to control the operation of a hydraulic cylinder or fluid pressure servo motor 36 and the interconnected linkage mechanism 37 for lifting and lowering hitch mechanism 14 and attached implement 15 in a predetermined range of vertical movement between working and non-working positions. Control valve 32 may be of the type shown and described in detail in said Brudnak et al. patent, hence it is depicted herein only in a generally schematic form since such disclosure is believed sufficient for purposes of understanding the present invention. Control of said valve is effected by movement of spool 31 through an operational range embracing three positions of the spool coordinated with draft loads. As illustrated valve spool 31 is slidably operative for controlling the flow of fluid through valve 32 and has associated therewith an inlet port 38 that may be connected by a conduit 39 to a source of fluid pressure such as a pump (not shown), a port 40 connected by a conduit 41 to servo motor 36, and axially spaced, oppositely disposed ports 42 and 43 connected by conduits 44, 45 to a reservoir source of fluid 46. Axially spaced lands 47, 48 and 49 on said spool delimit grooves 50 and 51 in the spool therebetween. A spring 52 reactively disposed between spool 31 and the valve body serves to normally urge said spool to a first position, to the right as viewed in FIG. 2 of the drawings.

In the first such position of valve 32, the solenoid coils 22, 23 being deenergized, the spool 31 is biased by spring 52 (to the right as viewed in FIG. 2) whereupon valve port 38 is then open and in communication by way of groove 50, port 42 and conduit 44 with reservoir 46 while port 40 is open and in communication by way of groove 51, port 43, conduit 45 with said reservoir with resulting operation of servo motor 36 and linkage 37 that permits hitch mechanism 14 and implement 15 to be lowered to a working range or setting preselected by the position of manual lever 18 of quadrant 16. When a position of the implement corresponding to the preselected setting of the implement 15 has been attained the sensing system 13 operates to transmit a signal which closes a switch such as 53 and thereby energizes coil 22 of solenoid 21. Energization of said coil causes armature member 27 to move leftwardly (as viewed in FIG. 2) overcoming the bias of valve spring 52 and carrying with it spool 31 to condition the valve for its second or neutral position. In this latter position the land 48 of spool 31 covers port 38 and interrupts communication between the latter port and the reservoir while land 49 covers port 43 and interrupts communication between ports 40 and 43. As thus positioned the valve is conditioned for neutral and servo motor 36 is maintained inoperative in its then attained position. Assuming continued working of the implement 15 spool 31 would remain in this second position unless and until the occurrence of a change in draft load of such magnitude as to call for a change in this relation.

Further movement of spool 31 (to the left as viewed in FIG. 2) to a third position transpires upon closing of switch 54 and actuation of armature member 25 by energization of coil 23—coil 22 being still energized, when the draft load increases to a value which is the greater of (1) the draft setting plus 200 lbs., or (2) the draft setting plus 5% thereof, and deemed to require the raising of the hitch 14 and implement 15 to ameliorate that condition. In this position port 38 is opened and communication is established by way of groove 51, port 40 and conduit 41 between servo motor 36 and the source of fluid pressure to effect a raising of the implement 15. After said implement has been raised to a position that will provide draft load corresponding to the draft setting or range allowance at which the implement was previously selected to work the sensing mechanism 13 will transmit a signal that opens switch 54 which then deenergizes coil 23 and permits the bias of spring 52 to return the valve spool 31 to its second or neutral position interrupting communication between ports 38 and 40 and thereby maintaining the implement at the then attained working position. For convenience switches 53 and 54 may be structurally closely associated with the sensing system mechanism 13 and the electrical current impulse produced as a result of closing said switches may then be transmitted by suitable conductors to the respective solenoid windings as is well understood.

The coils 22, 23 are so arranged in relation to each other and to the armature 24 that upon energization of them successively, the armature 24 will be displaced (to the left as viewed in FIG. 2) first upon energization of coil 22, a distance corresponding to that between the first and second positions of valve spool 31, and then upon energization of coil 23, farther in the same direction, a distance corresponding to that between the second and third positions of spool 31. Upon energization of coil 23, coil 22 remaining energized, armature member 27 will follow the movement leftwardly of armature member 25 to be stopped upon contact of armature member 25 with armature member 26. Adjustable means indicated generally at 55 may be provided to effect axial adjustment of armature member 26 when desired so as to have the movement of armature 24 coordinated with the movement of spool 31 within valve 32.

The wiring diagram of FIG. 3 illustrates the electrical circuits established in the operation of the invention. The implement 15 is in operative position. Under the previously stated condition of draft load acceptable below the selected draft setting the armature 24 is in initial inactive position when the valve spool 31 is spring-biased to the right in FIG. 2 and the lift mechanism 37 is conditioned for a dropping operation of the implement.

Upon increase of draft load reflected by the sensing mechanism 13 within the stated range of tolerance but calling for conditioning of the valve for operation, the implement having been dropped to the position corresponding to the preset load setting, the first phase of solenoid operation transpires when switch 53 is closed in response thereto and solenoid winding 22 is energized. When this occurs armature member 27 moves into abutting relation with armature member 25 a distance X (FIGS. 2 and 3) from the first to the second position whereupon the spool 31 of valve 32 is moved to condition the valve for neutral. Then upon on increase of draft load being reflected by the sensing mechanism 13 exceeding the stated tolerance and requiring operation of the valve to cause the lifting of implement 15 from its then operating position to a position of reduced load, switch 54 is closed in response thereto and winding 23 is energized. Armature member 25 thereupon moves into abutting relation with armature member 26, a distance Y (FIGS. 2 and 3) from the second to the third position, and spool 31 of control valve 32, moves correspondingly and establishes communication between ports 38 and 40, thereby causing operation of the hydraulic system and the lift mechanism 37 to raise implement 15 to a position of draft load compatible with the draft setting.

The implement 15 being thus raised, the draft load reflected by sensing mechanism 13 will decrease to a point where it will fall within the limits or range of the draft setting, thereby causing switch 54 to be opened and coil 23 to be deenergized. Thereupon armature 24 and spool 31 will be reversely displaced a distance Y returning the valve 32 to neutral position. If load decreases below the range of the preselected setting, switch 53 will open, coil 22 will be deenergized, and armature 24 and spool 31 will be reversely displaced a distance X to the original position under bias of spring 52, after which the lift mechanism 37 is actuated to lower implement 15 to the first condition of working. A full cycle of operation is then complete.

It will be understood that my invention is not limited to the precise arrangement that has been described but embraces such variations and modifications as may fall within the scope of the following claims.

What is claimed is:

1. In a control system for a tractor having hitch mechanism connecting an implement to the tractor in draft-receiving relation, hydraulic lift means on the tractor connected to the implement for raising and lowering said implement between selected positions in which said implement is respectively operative and inoperative, draft control means carried by the tractor including manually operable means for establishing selected draft settings and a control valve for controlling operation of said lift means, and draft sensing means connected to said hitch mechanism and being operatively responsive for sensing draft loads on said implement, electrical apparatus for regulating operation of said control valve in response to predetermined departures in draft load from said draft settings during operation of the implement, said apparatus comprising, a source of electrical energy, a solenoid having a first winding and a second winding and armature means adapted to be successively displaced axially thereof, first in one direction upon energization succesively of said windings and thereafter in opposite direction upon deenergization successively of said windings, first switch means operative in response to certain departures from said draft settings in draft load reflected by said draft sensing means to make and break an electrical circuit between said source and said first winding to energize, and deenergize, the latter, second switch means operative in response to certain other departures in draft load reflected by said draft sensing means from said draft settings to make and break an electrical circuit between said source and said second winding to energize, and deenergize, said second winding, and said control valve having a movable valve member operatively connected with said armature means for movement correspondingly therewith whereby to operate said valve and control the operation of said hydraulic lift means and said implement.

2. Electrical apparatus as defined in claim 1 in which said solenoid windings being deenergized, said control valve member is spring biased in a first position whereby said lift mechanism is operated to lower said implement to selected operative position and upon said first winding being energized said armature means will be actuated to displace said valve member to a second position, said lift mechanism being inactive, and said implement remaining in selected operative position.

3. Electrical apparatus as defined in claim 2 in which upon subsequent energization of said second winding said armature means will be further actuated to displace said valve member to a third position whereby to cause said lift mechanism to be operated to raise said implement to a position of reduced draft load.

4. Electrical apparatus as defined in claim 3 in which upon subsequent deenergization of said second winding, said first winding continuing to be energized, said armature means will be actuated reversely to return said valve member to second position, said lift mechanism being inactive, and said implement remaining in position of selected draft load.

5. Electrcal apparatus as defined in claim 3 in which upon subsequent deenergization of said second winding, said first winding continuing to be energized, said armature means is actuated reversely to return said valve member to second position, said lift mechanism being inactive, and said implement remaining in position of selected draft load, and upon subsequent deenergization of said first winding responsive to a reduction in draft load, said armature means is further actuated reversely to enable said valve member to be spring biased in its first position and said implement to be lowered to an operative position corresponding to said selected draft setting.

6. Electrical apparatus as defined in claim 1 in which said first switch means is operated to energize said first winding when the draft load is within selected range and which is the greater of the draft setting plus or minus 200 pounds, and the draft setting plus or minus five percent thereof, and said second switch means is operated to energize said second winding when the draft load is the greater of the draft setting plus 200 pounds, and the draft setting plus five percent thereof.

7. The invention according to claim 3 and further characterized in that said armature means is fashioned as three individual members normally axially spaced from one another when said movable valve member is spring biased to the first position thereof, but being positionable in adjacently engageable relation when said movable valve member is disposed in the third portion thereof.

8. In a tractor having a hydraulic system for operating a power lift mechanism capable of raising and lowering, between selected positions, an implement drawn by the tractor, said hydraulic system including manually operable means for establishing selected draft settings, and said tractor having a draft sensing mechanism responsive to a given draft setting established by said manually operable means for reflecting draft load affecting operation of said implement; the improvement comprising:

a valve member in said system spring biased to a first position when said draft load is less than said given draft setting whereby said lift mechanism is operated to lower said implement to maintain it at a selected draft load;

said valve member being movable to a second position in which it is conditioned for further operations, without actuating said lift mechanism and said implement remaining in operative position, and being movable to a third position in which said lift mechanism is operated to raise said implement to a position of reduced draft load;

a solenoid having first and second windings and armature means adapted to be successively displaced axially thereof, first in one direction upon energization successively of said windings and thereafter in the opposite direction upon deenergization successively of said windings;

switch means responsive to said draft sensing mechanism successively to energize and deenergize said windings;

and means operatively interconnecting said armature means and said valve member whereby upon displacement of said armature means in the stated sequence said valve member will be correspondingly operated between its said positions.

References Cited

UNITED STATES PATENTS

| | | | |
|---|---|---|---|
| 2,629,306 | 2/1953 | Rusconi | 172—2 |
| 3,246,701 | 4/1966 | Schulz | 172—9 |

FOREIGN PATENTS

| | | |
|---|---|---|
| 1,316,205 | 12/1962 | France. |

ABRAHAM G. STONE, *Primary Examiner.*

J. R. OAKS, *Assistant Examiner.*